US012448213B2

(12) United States Patent
Helmer

(10) Patent No.: US 12,448,213 B2
(45) Date of Patent: Oct. 21, 2025

(54) DEBRIS CHUTE ASSEMBLY

(71) Applicant: TDR Systems, Inc., Waldorf, MD (US)

(72) Inventor: Chad Helmer, Battle Ground, WA (US)

(73) Assignee: TDR Systems, Inc., Waldorf, MD (US)

( * ) Notice: Subject to any disclaimer, the term of this patent is extended or adjusted under 35 U.S.C. 154(b) by 96 days.

(21) Appl. No.: 18/388,213

(22) Filed: Nov. 9, 2023

(65) Prior Publication Data
US 2025/0153948 A1 May 15, 2025

(51) Int. Cl.
*B65G 11/02* (2006.01)
*B65G 11/18* (2006.01)

(52) U.S. Cl.
CPC ............ *B65G 11/02* (2013.01); *B65G 11/026* (2013.01); *B65G 11/186* (2013.01); *B65G 11/023* (2013.01); *B65G 11/183* (2013.01)

(58) Field of Classification Search
CPC ..... B65G 11/02; B65G 11/026; B65G 11/186; B65G 11/023; B65G 11/183
USPC .......................................................... 193/34
See application file for complete search history.

(56) References Cited

U.S. PATENT DOCUMENTS

| | | | | |
|---|---|---|---|---|
| 1,886,793 A * | 11/1932 | Davidson | ............ | B65G 11/186 |
| | | | | 193/34 |
| 3,627,090 A * | 12/1971 | Dickey | ............ | E04G 21/30 |
| | | | | 193/34 |
| 4,640,403 A * | 2/1987 | McDermott | ......... | B65G 11/083 |
| | | | | 193/34 |
| 5,472,768 A | 12/1995 | Anson | | |
| 5,941,362 A * | 8/1999 | Preston | ............ | E04F 17/12 |
| | | | | 193/34 |
| 7,581,629 B2 | 9/2009 | Kohler | | |
| 7,648,015 B2 | 1/2010 | Gilmore | | |
| 9,555,968 B2 | 1/2017 | Seaton | | |
| 10,053,291 B1 * | 8/2018 | Van Bogaert | ........ | B65G 11/186 |
| 10,329,091 B2 | 6/2019 | Hogan | | |
| 2005/0155837 A1 * | 7/2005 | Nyquist | ............ | B65F 1/0093 |
| | | | | 193/34 |
| 2006/0113159 A1 * | 6/2006 | Nyquist | ............ | B65F 1/0093 |
| | | | | 193/34 |
| 2009/0133985 A1 * | 5/2009 | Preston | ............ | B65F 1/0093 |
| | | | | 193/34 |
| 2020/0307915 A1 | 10/2020 | Stodulka | | |
| 2024/0328173 A1 * | 10/2024 | Helmer | ............ | B65G 11/02 |

FOREIGN PATENT DOCUMENTS

| | | | | |
|---|---|---|---|---|
| CN | 110329713 | | 6/2019 | |
| WO | WO2008031173 | | 9/2006 | |
| WO | WO-2008031173 A1 * | | 3/2008 | ........... B65G 11/026 |

* cited by examiner

*Primary Examiner* — Mark A Deuble
(74) *Attorney, Agent, or Firm* — Sand, Sebolt & Wernow Co., LPA

(57) ABSTRACT

A debris chute assembly for removing debris from a height during construction or similar activity includes a scaffold, a plurality of wall members, and a plurality of corner members. The wall members hang on ledgers of the scaffold in tubular sections which align with each other. The corner members attach to standards of the scaffold and retain the wall members in fixed positions with respect to the scaffold. Various embodiments of corner members are provided which attach to the scaffold by various fastening means.

20 Claims, 11 Drawing Sheets

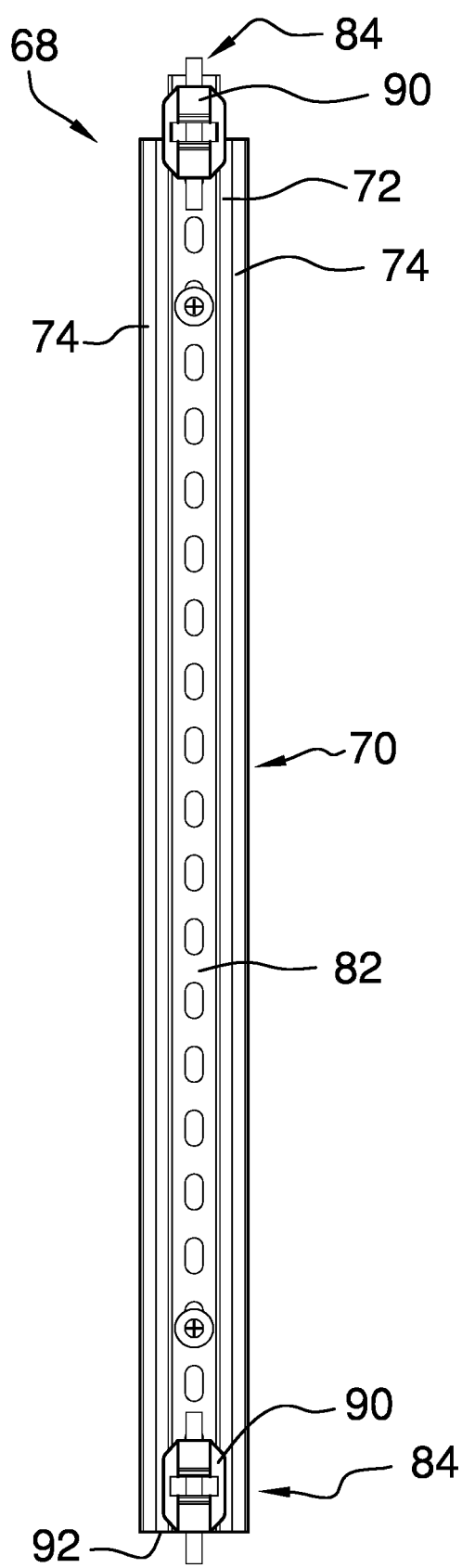
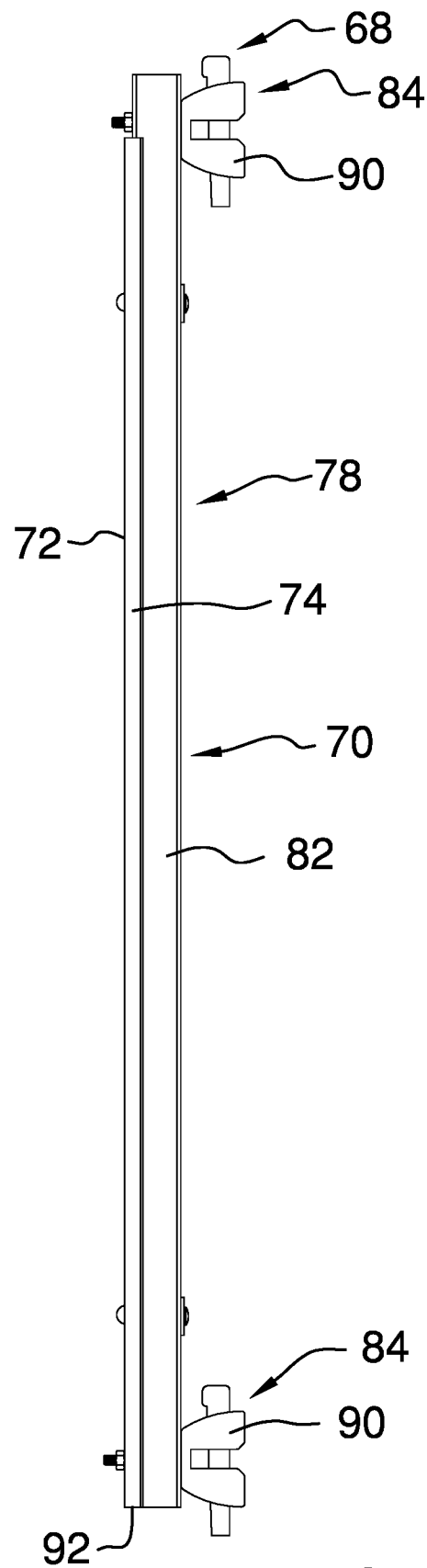
FIG. 11
FIG. 12

DEBRIS CHUTE ASSEMBLY

TECHNICAL FIELD

The disclosure relates to debris chutes and more particularly pertains to a new debris chute for removing debris from a height during construction or similar activity.

BACKGROUND ART

The prior art discloses myriad debris chutes for use at construction sites or similar to remove debris from a height. It is known, for example, that plywood debris chutes are constructed to mount within scaffolds to form a debris chute. However, such debris chutes are labor intensive to construct, and plywood is not as durable as many types of sheet metal.

U.S. Patent Publication Application No. 2020/0307915 (Stodulka) describes a debris chute comprising wall members and corner members made of sheet metal that hook onto ledgers of a scaffold. Fasteners are not positively described in the specification of this application beyond the hooked portions of the wall members and corner members which hang on ledgers of the scaffold. Without further attachment or locking mechanism, the wall members of the disclosed debris chute are likely to swing due to wind or other forces. Such movement would facilitate damage to the wall members as debris is dropped onto the swinging wall members and facilitate the release of dust or other objects through gaps formed between wall members.

SUMMARY OF THE INVENTION

A new debris chute comprising wall members and corner members attached to a scaffold which ensures that the wall members remain fixedly secured to the scaffold is therefore desirable. A debris chute of the type described above which fixedly secures the corner members to the scaffold and causes the corner members to abut the wall members, thereby fixedly securing the wall members to the scaffold, would solve the problem presented. It is also noted that such a device would also be advantageous over a similar device which fastens adjacent corner and wall members via threaded fasteners or the like, because the creation and alignment of holes in the corner and wall members would be avoided. Instead, only simple clamping mechanisms or the like would be required to cause the corner members to engage the standards of the scaffold.

An embodiment of the disclosure meets the needs presented above by generally comprising a scaffold comprising a plurality of standards which are spaced from each other. Each standard extends between a top end and a bottom end. The plurality of standards define a channel between the standards. The scaffold also includes a plurality of ledgers. Each ledger is coupled to and extends between a pair of associated standards of the plurality of standards. The ledgers are arranged in a plurality of levels which are spaced from each other along the channel. The ledgers of each channel are arranged in a closed loop formed around the channel. A plurality of wall members is coupled to the scaffold. The wall members are arranged in a plurality of tubular sections surrounding the channel. Each tubular section is coupled to the ledgers of an associated level of the plurality of levels. A plurality of corner members is also removably coupled to the scaffold. Each corner member is mounted to an associated standard of the plurality of standards and is positioned between a pair of associated wall members of the plurality of wall members. Each corner member comprises a corner panel which engages the pair of associated wall members to retain the panels of the pair of associated wall members in a fixed position with respect to the scaffold.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein:

FIG. 11 (FIG. 11) is a front view of a corner member of an embodiment of the disclosure.

FIG. 12 (FIG. 12) is a rear view of a corner member of an embodiment of the disclosure.

DETAILED DESCRIPTION

Figure 1:
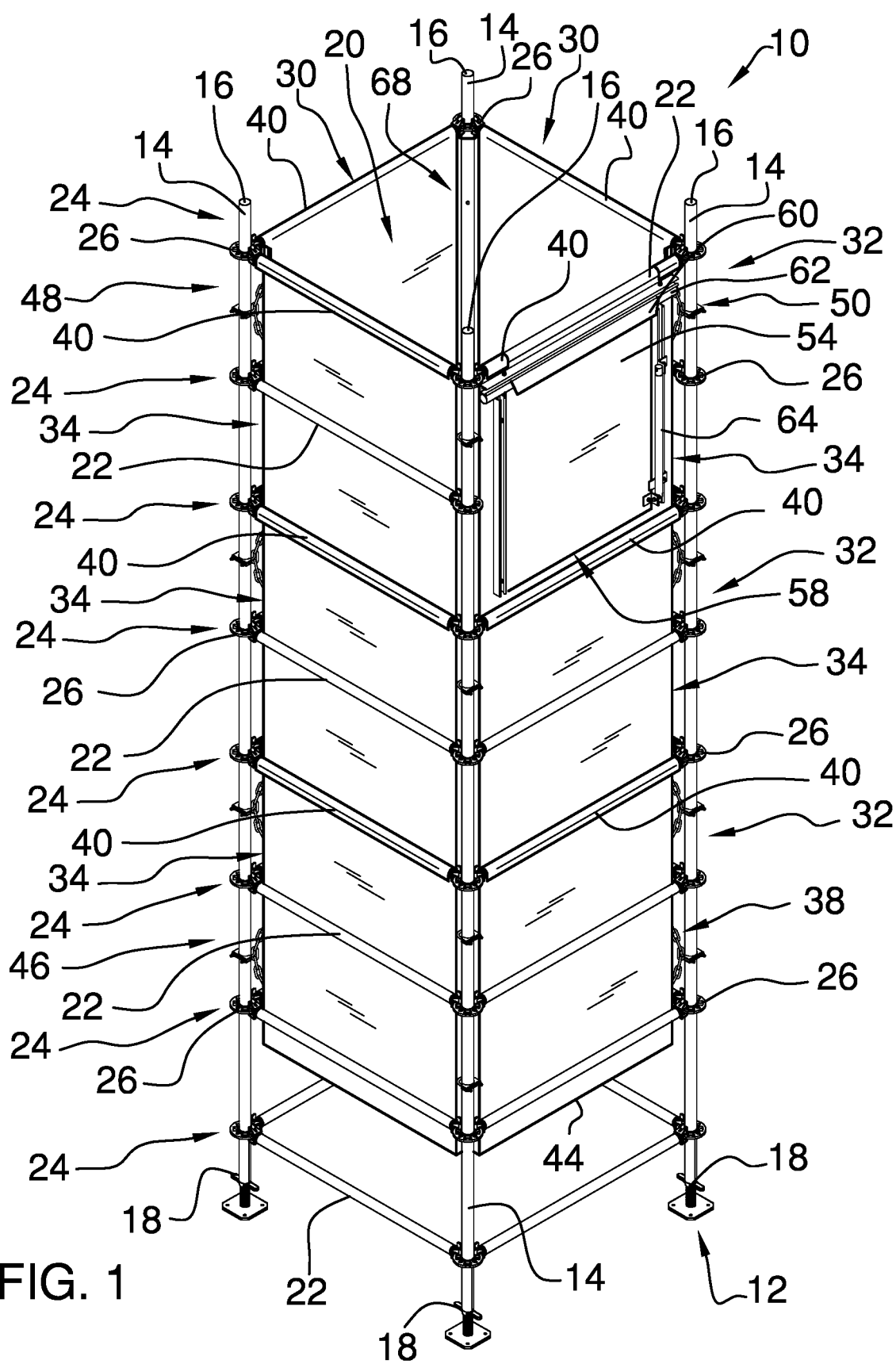
FIG. 1 (FIG. 1) is a perspective view of a debris chute assembly according to an embodiment of the disclosure.
Figure 2:
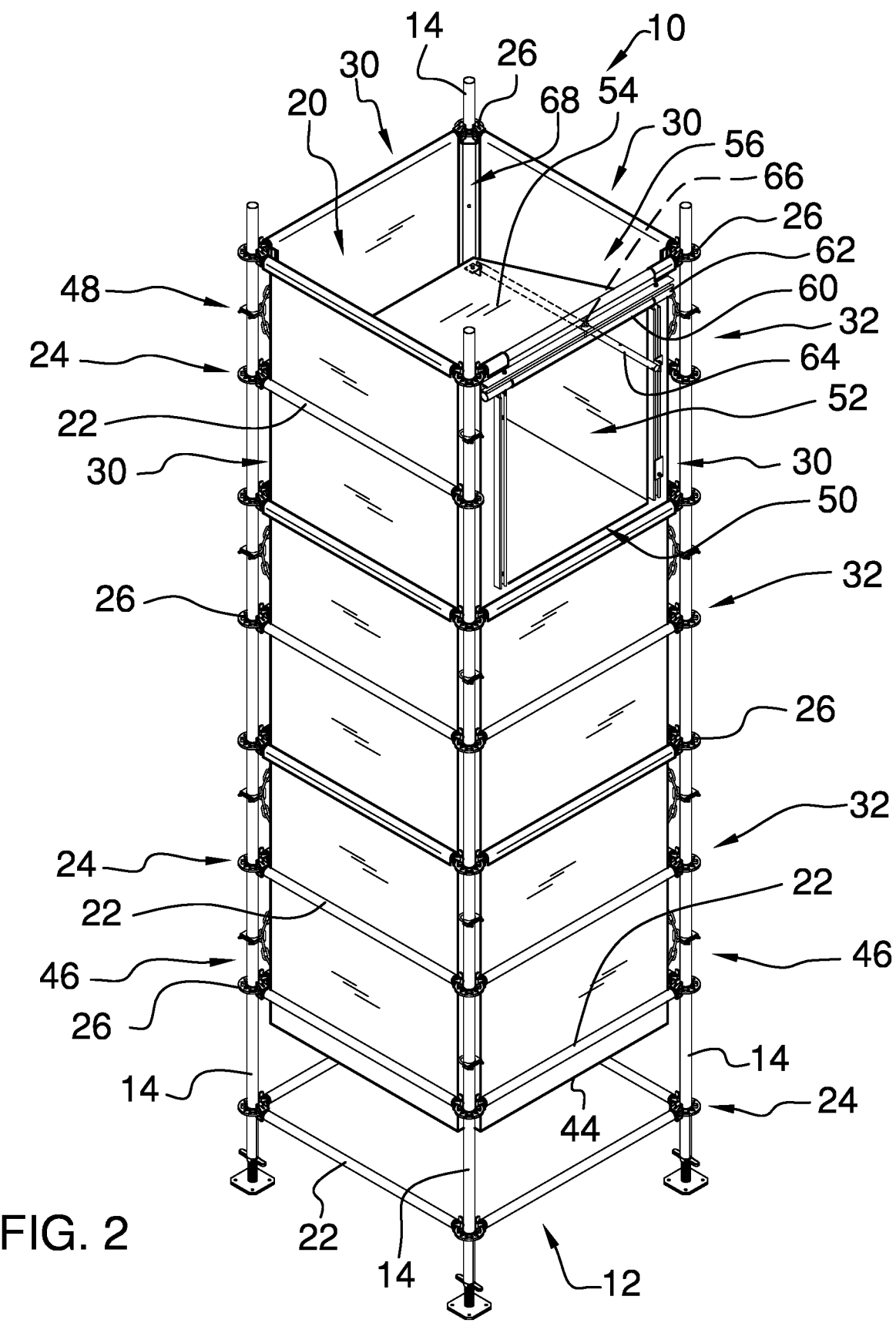
FIG. 2 (FIG. 2) is a perspective view of an embodiment of the disclosure.
Figure 3:
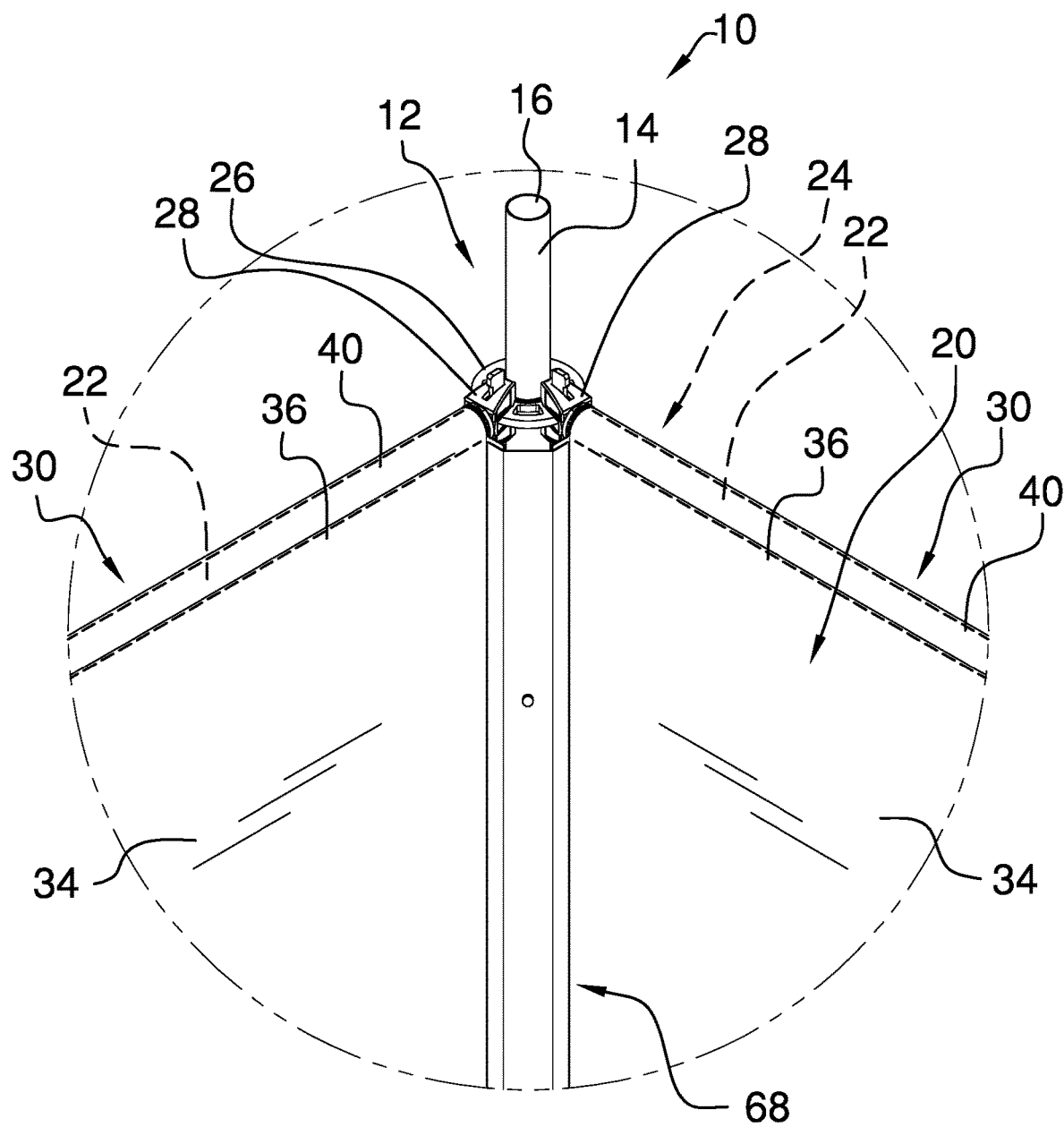
FIG. 3 (FIG. 3) is a detailed perspective view of a corner member of an embodiment of the disclosure.
Figure 4:
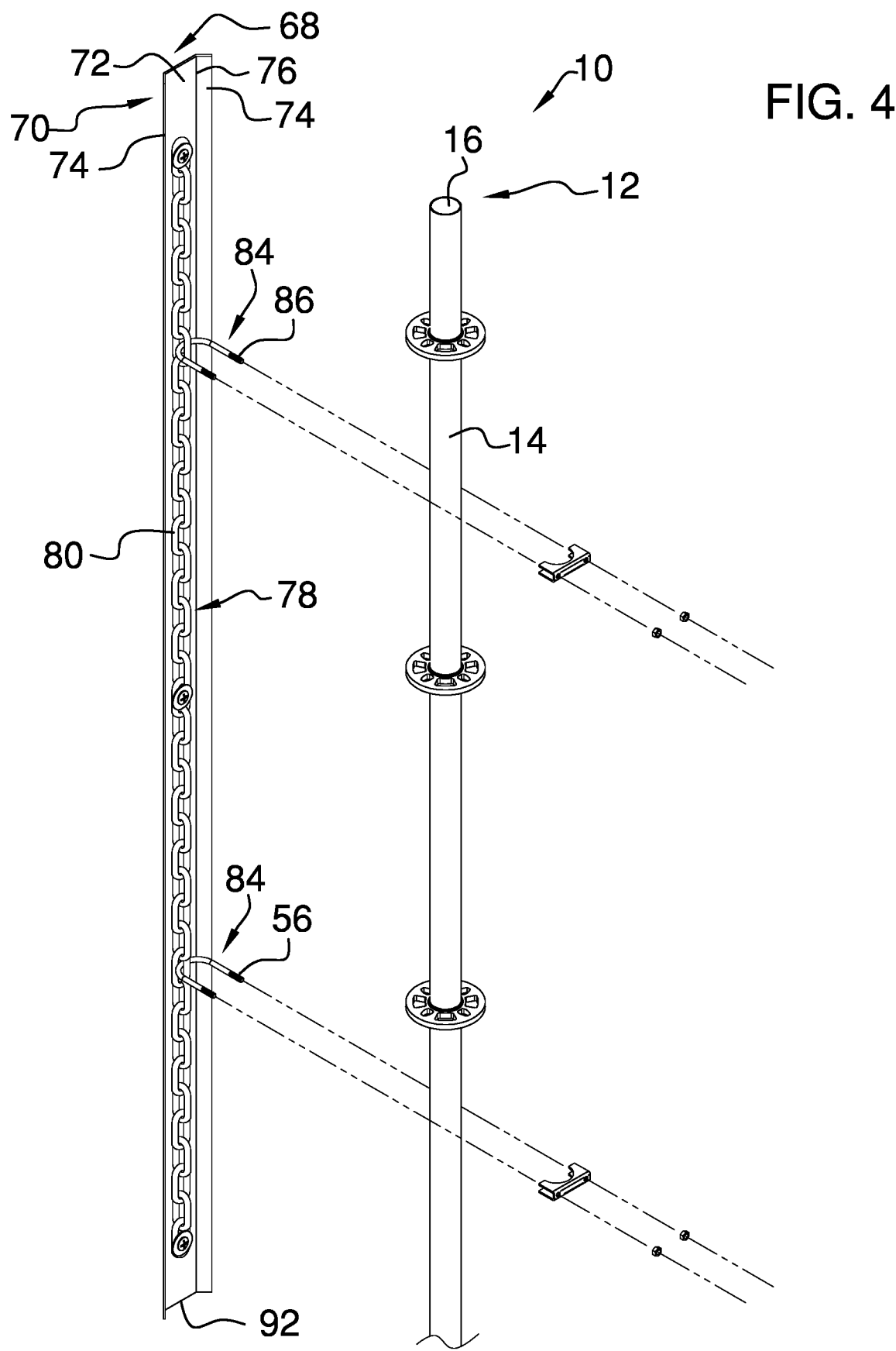
FIG. 4 (FIG. 4) is an exploded perspective view of a corner member and a standard of an embodiment of the disclosure.
Figure 5:
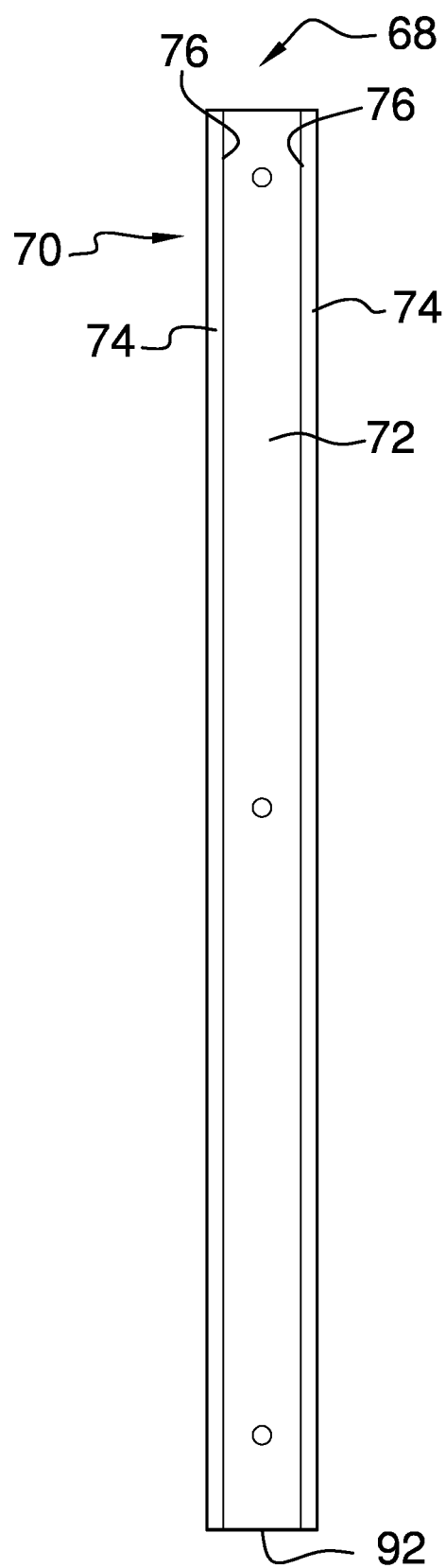
FIG. 5 (FIG. 5) is a front view of a corner member of an embodiment of the disclosure.
Figure 6:
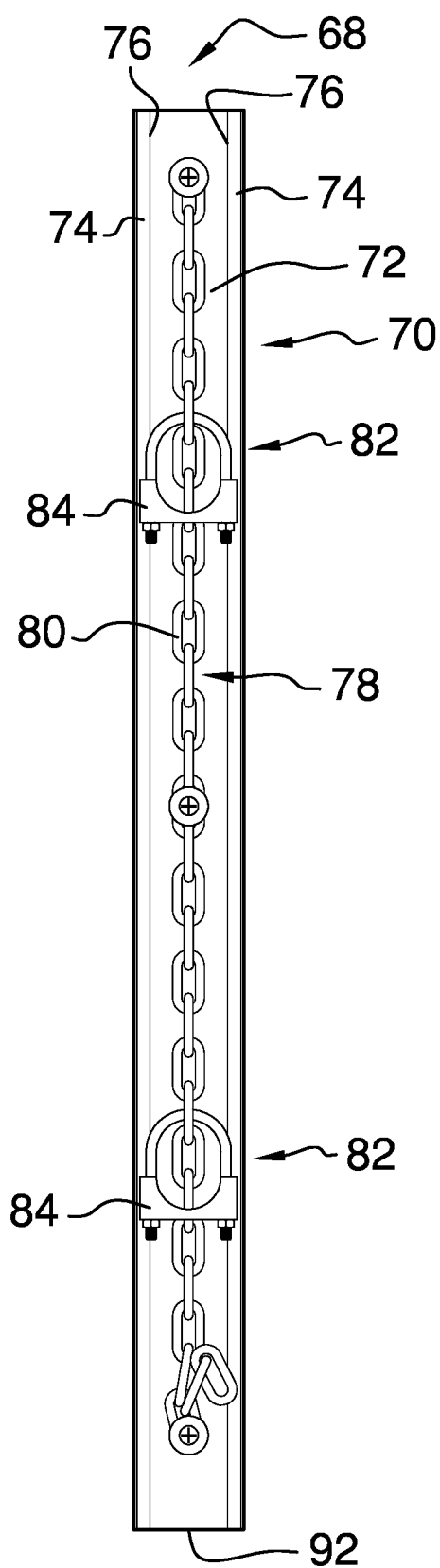
FIG. 6 (FIG. 6) is a rear view of a corner member of an embodiment of the disclosure.

With reference now to the drawings, and in particular to FIGS. 1 through 14 thereof, a new debris chute embodying the principles and concepts of an embodiment of the disclosure and generally designated by the reference numeral 10 will be described.

As best illustrated in FIGS. 1 through 14, the debris chute assembly 10 generally comprises a scaffold 12 having a plurality of standards 14 and a plurality of ledgers 22. The standards 14 are spaced from each other and extend between a top end 16 and a bottom end 18. The standards 14 define a channel 20 between the standards 14. Each ledger 22 is coupled to and extends between a pair of associated standards 14 of the plurality of standards 14. The ledgers 22 are arranged in a plurality of levels 24 which are spaced from each other along the channel 20. In each level 24, the ledgers 22 form a closed loop around the channel 20.

The scaffold 12 also includes a plurality of rosettes 26 and a plurality of wedge pins 28. Each rosette 26 is coupled to an associated standard 14 of the plurality of standards 14, and each wedge pin 28 extends through an associated ledger 22 of the plurality of ledgers 22 and an associated rosette 26 of the plurality of rosettes 26, thereby securing the associated ledger 22 to the associated rosette 26. It is contemplated that other embodiments may not have the scaffold 12 but may instead use vertical and horizontal members similar to the standards 14 and ledgers 22 of the scaffold 12. It is noted, however, that a particular advantage of including the scaffold 12 is that the scaffold 12 may be easily attached to further scaffolding 96 built for workers to navigate to perform various construction and repair activities and to access the debris chute assembly 10. The scaffold 12 of some embodiments may not have rosettes 26 and wedge pins 28, instead relying on alternative attachment means known to the art such as clamps.

Figure 13:
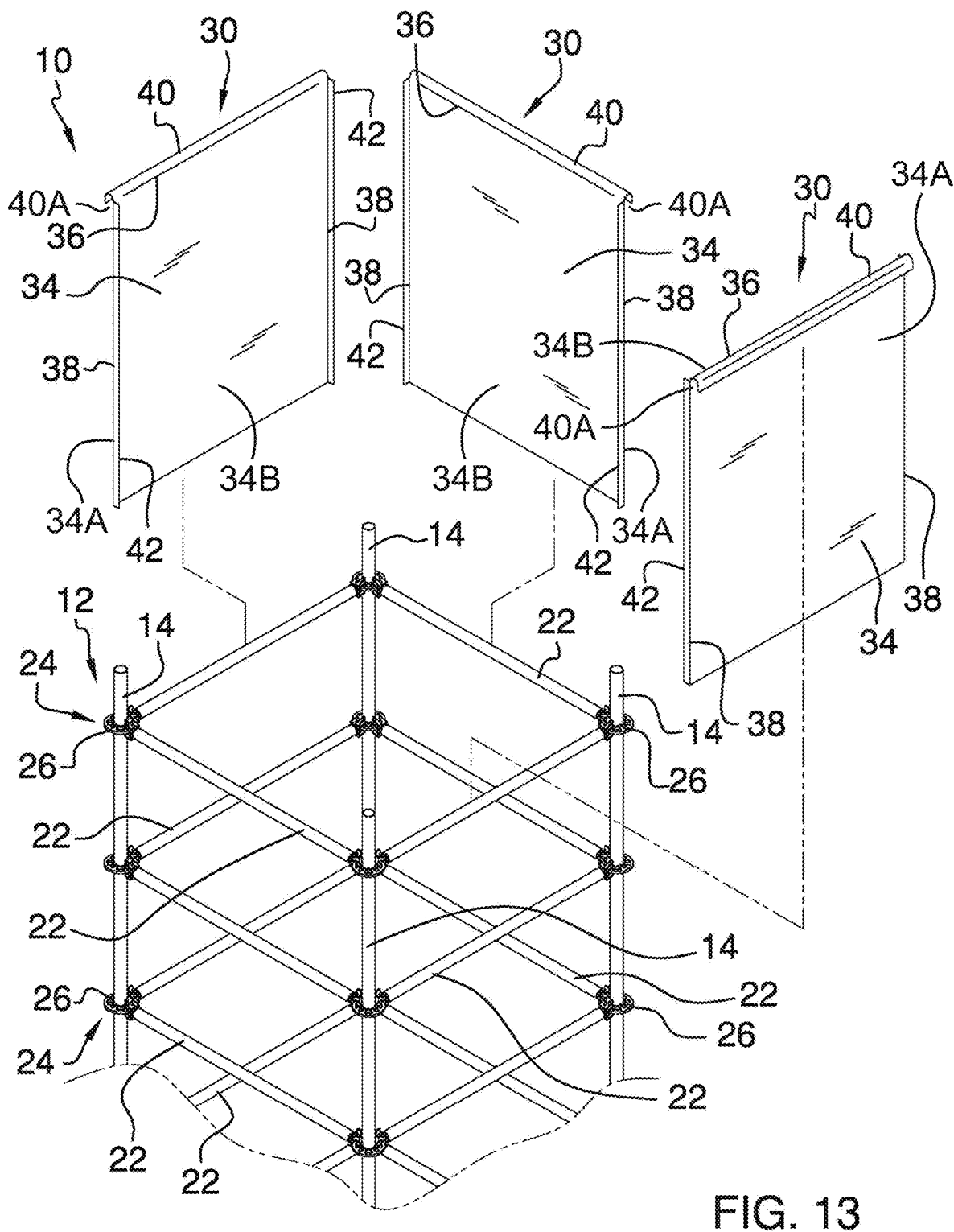
FIG. 13 (FIG. 13) is an exploded detail perspective view of an embodiment of the disclosure.
Figure 14:
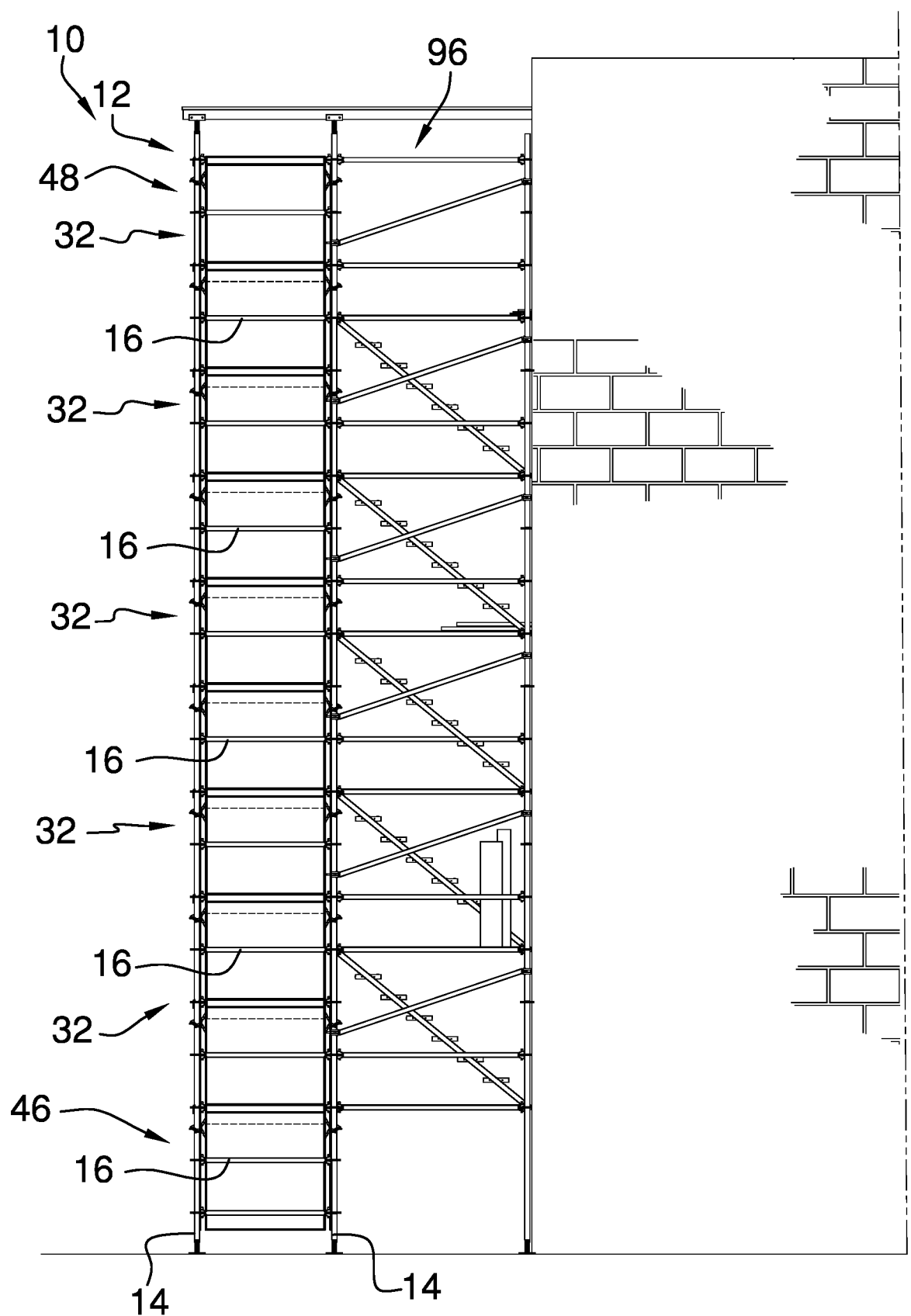
FIG. 14 (FIG. 14) is an in-use view of an embodiment of the disclosure.

A plurality of wall members 30 is removably coupled to the scaffold 12. The wall members 30 are arranged in a plurality of tubular sections 32 which surround the channel 20. Each tubular section 32 is coupled to the ledgers 22 of an associated level 24 of the plurality of levels 24. Each wall member 30 of the plurality of wall members 30 comprises a wall panel 34, a hook 40, and a pair of wall flanges 42. As best seen in FIG. 13, Each wall panel 34 has an outer surface 34A, an inner surface 34B, an upper end 36, a lower end 37, and a pair of lateral edges 38 extending between the upper end 36 and lower end 37. The inner surfaces 34B of the wall panels 34 bound and define the channel 20 extending through debris chute assembly 10. The hook 40 is coupled to an upper end 36 of the wall panel 34 and a passageway 40A is defined between the hook 40 and outer surface 34A. Hook 40 is configured to receive an associated ledger 22 of the ledgers 22 and to enable the wall panel 34 to hang hangs onte from the associated ledger 22 of the ledgers 22 of the associated level 24. The hook 40 extends outwardly from the channel 20 and from the wall panel 34. The pair of wall flanges 42 is coupled to a pair of lateral edges 38 of the wall panel 34. The wall flanges 42 extend inwardly into the channel 20 from the wall panel 34, and each wall flange 42 of the pair of wall flanges 42 is oriented perpendicularly to the wall panel 34. The wall panel 34, hook 40, and wall flanges 42 are formed of a unitary sheet metal but may use other suitable materials. A lower end 44 of each tubular section 32 except a bottommost section 46 of the plurality of tubular sections 32 overlaps an upper end 36 of an associated adjacent tubular section 32 of the plurality of tubular sections 32, closing any gaps that would otherwise form between tubular sections 32.

One of the wall members 30 of a topmost section 48 of the plurality of tubular sections 32 defines a hopper wall member 50, and other embodiments may include more hopper wall members 50. The wall panel 34 of the hopper wall member 50 defines an aperture 52 which extends through the wall panel 34. The hopper wall member 50 further comprises a door 54 to access the channel 20 through the aperture 52, a bar 62, and a prop 64. The door 54 is pivotally coupled to the wall panel 34 of the hopper wall member 50 and is movable between an open position 56 and a closed position 58 with respect to the aperture 52. The door 54 has a hooked upper edge 60 which extends around the bar 62, which is coupled to the wall panel 34. The bar 62 is oriented horizontally so that the door 54 is pivotable around the bar 62 and gravity biases the door 54 toward the closed position 58.

The prop 64 is engageable with the door 54 to maintain the door 54 in the open position 56. The prop 64 is telescopically extendable and is mounted to the door 54 and the wall panel 34 of the hopper wall member 50. The prop 64 is lockable in an extended position to maintain the door 54 away from the wall panel 34 in the open position 56. A locking pin 66 or similar may be employed to lock the prop 64 in the extended position. It may be possible to secure the prop 64 in multiple positions such that the door 54 may be adjusted to various degrees of openness with respect to the aperture 52.

A plurality of corner members 68 is removably coupled to the scaffold 12. Each corner member 68 is releasably mounted to an associated standard 14 of the plurality of standards 14 and is positioned between a pair of associated wall members 30 of the plurality of wall members 30. The corner members 68 act to close gaps made between wall members 30 of the same tubular section 32 and keep the wall members 30 from swinging inwardly into the channel 20 due to wind or other external forces.

Each corner member 68 comprises a corner panel 70, an elongated member 78, and a plurality of couplers 84. The corner panel 70 engages the pair of associated wall members 30 to retain the panels of the pair of associated wall members 30 in a fixed position with respect to the scaffold 12. The corner panel 70 comprises a central portion 72 and a pair of flange portions 74. The pair of flange portions 74 is coupled to a pair of side edges 76 of the central portion 72, and each flange portion 74 engages the wall flange 42 of one of the pair of associated wall members 30. The flange portions 74 may form 45-degree angles with the central portion 72 to align with the wall flanges 42 of the associated wall members 30. The corner panel 70 comprises a unitary sheet metal but may use other suitable materials.

The elongated member 78 is coupled to the corner panel 70 and is oriented parallel to the associated standard 14. The plurality of couplers 84 is coupled to the elongated member 78 and the associated standard 14, thereby securing the corner member 68 to the standard 14. A downward end 92 of each corner member 68 except a bottommost corner member (not shown) overlaps an upward end of an associated adjacent corner member 68 of the plurality of corner members 68, covering any gaps that would otherwise be formed between adjacent corner members 68.

Various embodiments of the corner members 68 are depicted in the figures. In reference to FIGS. 4 through 6, a first embodiment of the corner members 68 is depicted, in which the elongated member 78 comprises a chain 80, and each coupler 84 of the plurality of couplers 84 comprises a U-bolt clamp 86. Each coupler 84 is interlocked with the chain 80 and clamps onto the associated standard 14. Couplers 84 of similar embodiments may include pipe clamps, ties, latches, or the like.

Figure 7:
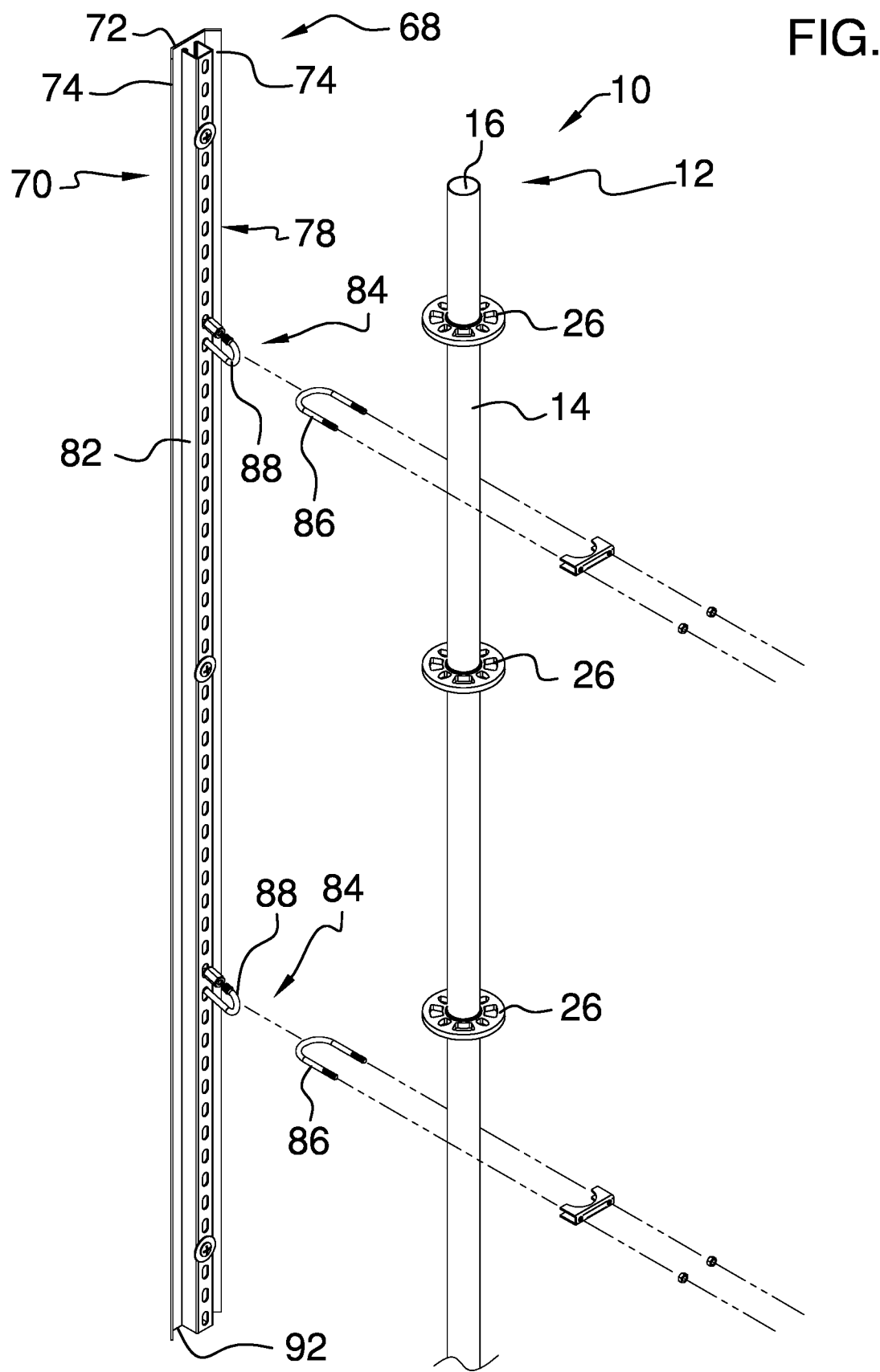
FIG. 7 (FIG. 7) is an exploded perspective view of a corner member and a standard of an embodiment of the disclosure.
Figure 8:
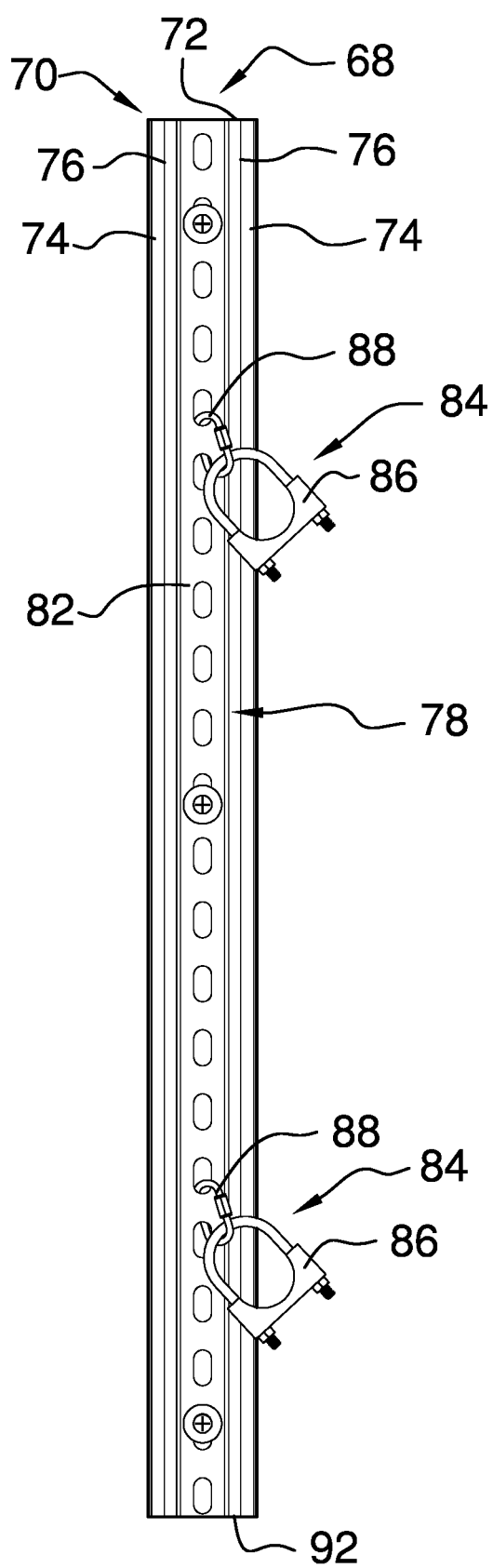
FIG. 8 (FIG. 8) is a front view of a corner member of an embodiment of the disclosure.
Figure 9:
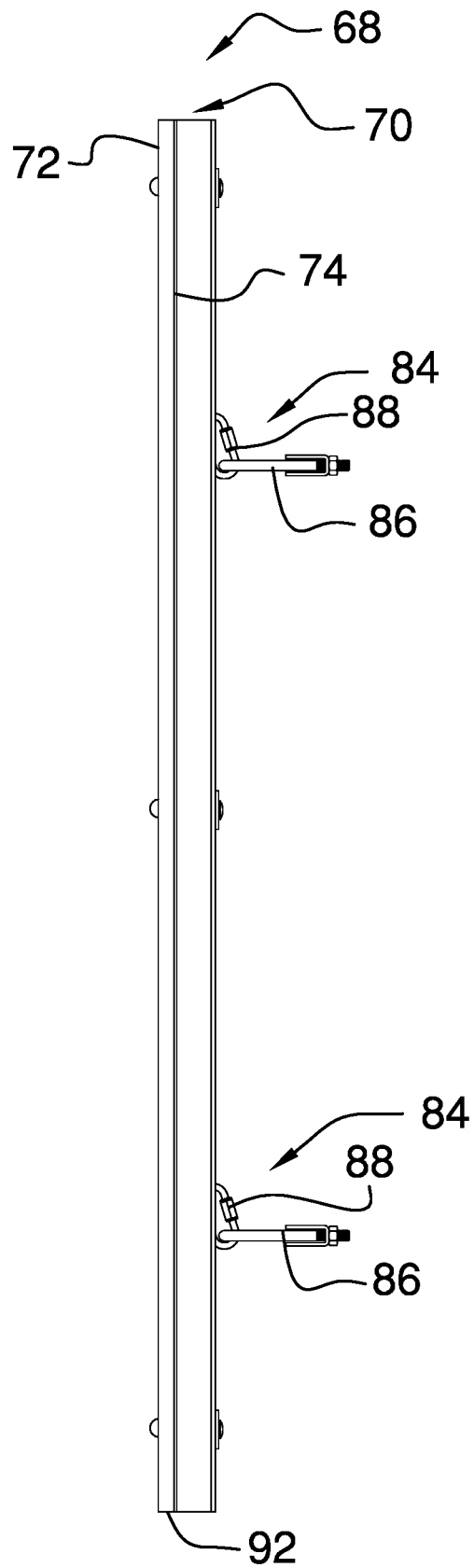
FIG. 9 (FIG. 9) is a rear view of a corner member of an embodiment of the disclosure.

FIGS. 7 through 9 show a second embodiment of the corner members 68, in which the elongated member 78 comprises a slotted channel 82, and each coupler 84 comprises a quick-chain link 88 and a U-bolt clamp 86. The quick-chain link 88 of each coupler 84 is interlocked with the slotted channel 82. The U-bolt interlocks with the quick-chain link 88 and clamps onto the associated standard 14. Couplers 84 of similar embodiments may include pipe clamps, ties, latches, or the like.

Figure 10:
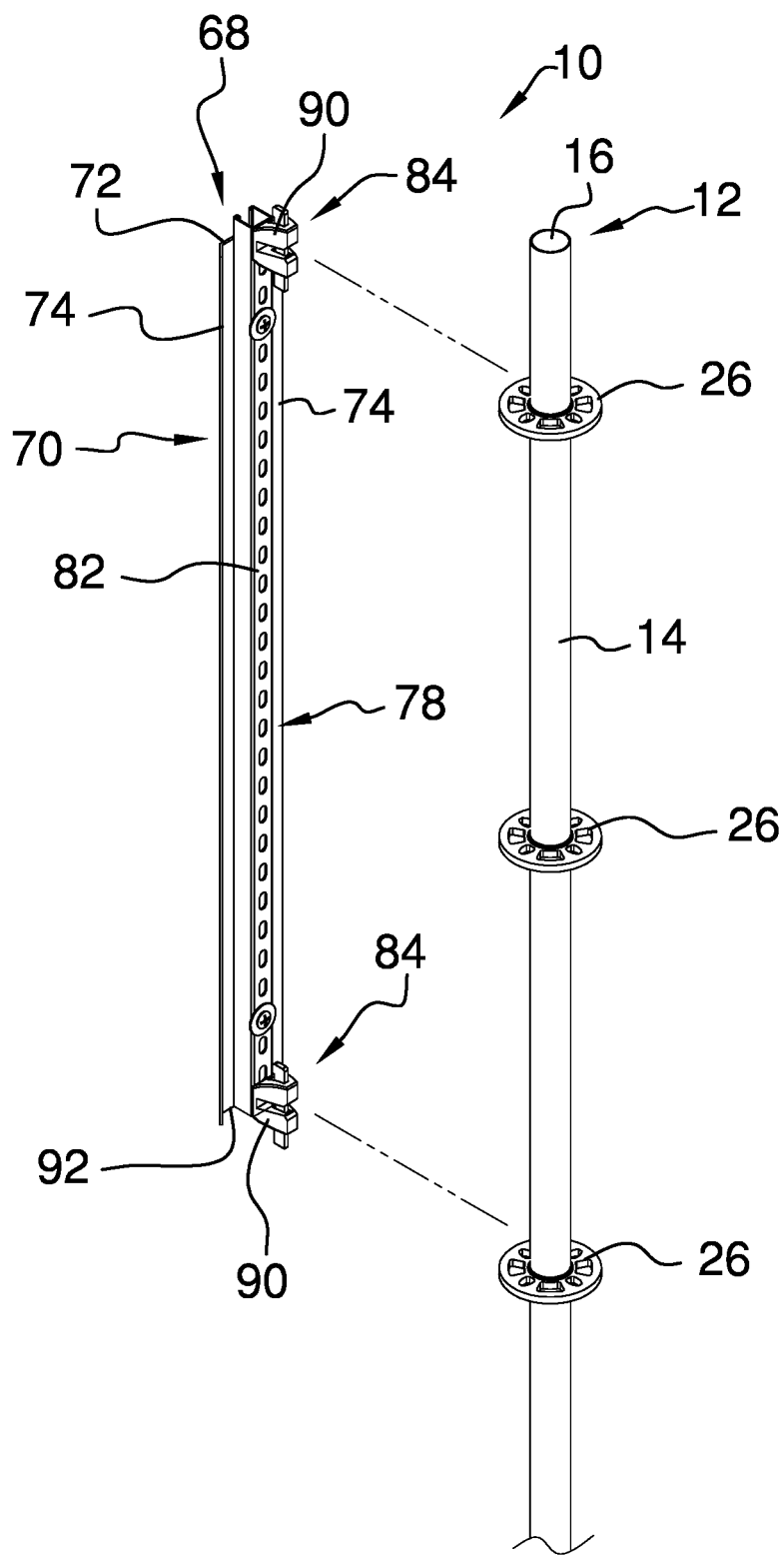
FIG. 10 (FIG. 10) is an exploded perspective view of a corner member and a standard of an embodiment of the disclosure.

In reference to FIGS. 10 through 12, a third embodiment of the corner members 68 is depicted in which the elongated member 78 comprises a slotted channel 82 and each coupler 84 of the plurality of couplers 84 comprises a wedge pin coupling 90. Each coupler 84 of the plurality of couplers 84 is coupled to an associated rosette 26 on the associated standard 14.

In use, the debris chute assembly 10 is assembled as described and debris from construction work or the like is fed through apertures 52 of hopper wall members 50 to be dropped into a desired location below the debris chute assembly 10. A dumpster or similar may be positioned below the debris chute assembly 10 to contain the dropped debris.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A debris chute assembly comprising:
    a scaffold comprising:
        a plurality of standards spaced a distance apart from one another;
        a plurality of ledgers extending between adjacent standards of the plurality of standards;
    a plurality of wall members;
        a passageway defined in a wall member of the plurality of wall members;
        wherein a ledger of the plurality of ledgers is received within the passageway;
        wherein the plurality of wall members each comprise a pair of lateral edges; a plurality of corner members;
        wherein each corner member of the plurality of corner members extends beyond at least one of the pair of lateral edges of adjacent wall members of the plurality of wall members; and
        wherein the plurality of corner members secures the plurality of wall members to the plurality of standards.

2. The debris chute assembly according to claim 1, wherein each wall member of the plurality of wall members comprises:
    an inner surface and an outer surface opposite the inner surface; and
    wherein the inner surfaces of the plurality of wall members bound and define a channel extending from a top end through to a bottom end of the debris chute assembly.

3. The debris chute assembly according to claim 1, wherein each corner member of the plurality of corner members comprises:
    a corner panel;
    an elongated member; and
    a coupler configured to couple the corner panel and the elongated member to one another.

4. The debris chute assembly according to claim 3, wherein the coupler is further configured to couple the corner panel and the elongated member to a standard of the plurality of standards.

5. The debris chute assembly according to claim 3, wherein the corner panel engages the adjacent wall members and retains the adjacent wall members in a fixed position with respect to the plurality of standards to the scaffold.

6. The debris chute assembly according to claim 3, wherein the corner panel of each corner member comprises:
    a central portion; and
    a pair of flange portions extending outwardly from opposite side edges of the central portion.

7. The debris chute assembly according to claim 6, wherein the wall member of the plurality of wall members further comprises:
    a wall panel; and
    a wall flange provided on each side of the wall member.

8. The debris chute assembly according to claim 7, wherein the wall flange extends inwardly from an inner surface of the wall member and into a channel defined by the debris chute assembly.

9. The debris chute assembly according to claim 8, wherein each flange portion of the pair of flange portions of the corner panel engages one of the wall flanges of the adjacent wall members.

10. The debris chute assembly according to claim 9, wherein each flange portion of the pair of flange portions aligns with one of the wall flanges of the adjacent wall members.

11. The debris chute assembly according to claim 6, wherein each flange portion of the pair of flange portions is arranged at 45 degrees relative to the central portion of the corner panel.

12. The debris chute assembly according to claim 3, wherein the elongated member is oriented parallel to an associated standard of the plurality of standards.

13. The debris chute assembly according to claim 3, wherein the elongated member comprises one of a chain and a slotted channel.

14. The debris chute assembly according to claim 1, wherein the wall member of the plurality of wall members comprises:
    a wall panel having a top, a bottom, and a first side and a second side extending between the top and the bottom; and
    a first flange extending outwardly from the first side of the wall panel; and
    a second flange extending outwardly from the second side of the wall panel.

15. The debris chute assembly according to claim 1, wherein the wall member of the plurality of wall members comprises:
    a wall panel having an inner surface and an outer surface, wherein the inner surface bounds a channel defined by the debris chute assembly;
    a hook extending outwardly from the outer surface of the wall panel; and
    wherein the passageway is defined between the hook and the outer surface of the wall panel.

16. The debris chute assembly according to claim 15, wherein the plurality of wall members comprises:
  a first wall member and a second wall member;
  wherein an aperture is defined between an outer surface and an inner surface of the second wall member; and
  wherein the aperture is in fluid communication with a channel defined by the debris chute assembly.

17. The debris chute assembly according to claim 16, further comprising:
  a door located proximate the aperture;
  wherein the door is moveable between an open position and a closed position;
  wherein when the door is the open position access to the channel of the debris chute assembly is enabled; and
  wherein when the door is in the closed position access to the channel of the debris chute assembly is restricted.

18. A method of assembling and utilizing a debris chute assembly comprising:
  spacing a plurality of standards of a scaffold apart from one another;
  extending a ledger of a plurality of ledgers of the scaffold between adjacent standards of the plurality of standards;
  providing a plurality of wall members with a pair of lateral edges;
  defining a passageway in each wall member of the plurality of wall members;
  receiving an associated ledger of the plurality of ledgers within the passageway of a wall member of the plurality of wall members;
  hanging the wall member from the associated ledger;
  providing a plurality of corner members;
  extending a corner member of the plurality of corner members beyond at least one of the pair of lateral edges of adjacent wall members; and
  securing the adjacent wall members to an associated standard of the plurality of standards via the corner member.

19. The method according to claim 18, further comprising:
  defining a channel extending through the debris chute assembly;
  defining an aperture extending through at least one wall member of the plurality of wall members;
  placing the aperture in fluid communication with the channel of the debris chute assembly;
  providing a door proximate the aperture;
  selectively moving the door between an open position and a closed position.

20. A debris chute assembly comprising:
  a scaffold comprising:
    a plurality of standards spaced a distance apart from one another;
    a plurality of ledgers extending between adjacent standards of the plurality of standards;
  a plurality of wall members;
    a passageway defined in a wall member of the plurality of wall members;
    wherein a ledger of the plurality of ledgers is received within the passageway;
  wherein each wall member of the plurality of wall members comprises:
    an inner surface and an outer surface opposite one another; and
      wherein the inner surfaces of the plurality of wall members bound and define a channel extending from a top end through to a bottom end of the debris chute assembly;
  a plurality of corner members;
    wherein each corner member of the plurality of corner members extends between adjacent wall members of the plurality of wall members;
    wherein each corner member extends between the inner surfaces of the adjacent wall members; and
    wherein the plurality of corner members secures the plurality of wall members to the plurality of standards.

* * * * *